United States Patent
Koiwai et al.

(10) Patent No.: US 9,935,525 B2
(45) Date of Patent: Apr. 3, 2018

(54) ELECTRIC MOTOR

(71) Applicant: KOBELCO CONSTRUCTION MACHINERY CO., LTD., Hiroshima-shi (JP)

(72) Inventors: Kazushige Koiwai, Hiroshima (JP); Seiji Saiki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 304 days.

(21) Appl. No.: 14/760,091

(22) PCT Filed: Dec. 20, 2013

(86) PCT No.: PCT/JP2013/007512
§ 371 (c)(1),
(2) Date: Jul. 9, 2015

(87) PCT Pub. No.: WO2014/112013
PCT Pub. Date: Jul. 24, 2014

(65) Prior Publication Data
US 2015/0357885 A1 Dec. 10, 2015

(30) Foreign Application Priority Data
Jan. 18, 2013 (JP) ................. 2013-006889

(51) Int. Cl.
*H02K 11/00* (2016.01)
*G01K 1/14* (2006.01)
(Continued)

(52) U.S. Cl.
CPC .......... *H02K 11/0047* (2013.01); *G01K 1/14* (2013.01); *G01K 13/08* (2013.01); *H02K 11/25* (2016.01); *H02K 5/08* (2013.01)

(58) Field of Classification Search
CPC .......... H02K 11/20; H02K 11/25; G01K 1/14; G01K 13/08
(Continued)

(56) References Cited

U.S. PATENT DOCUMENTS 6,153,954 A * 11/2000 Uchida ................. H02K 11/25
310/68 C
2002/0006154 A1  1/2002 Nada
(Continued)

FOREIGN PATENT DOCUMENTS

CN    1141528 A    1/1997
CN    1322940 A   11/2001
(Continued)

OTHER PUBLICATIONS

Aoi, Machine Translation of JP11225458, Aug. 1999.*
(Continued)

*Primary Examiner* — Quyen Leung
*Assistant Examiner* — Eric Johnson
(74) *Attorney, Agent, or Firm* — Oblon, McClelland, Maier & Neustadt, L.L.P.

(57) ABSTRACT

An electric motor to be easily assembled while taking the advantages of a retrofitted electric motor, excellent maintenance performance and no fear of damage in a temperature sensitive device due to resin injection pressure. The electric motor includes an electric motor shaft, a rotor, a stator, a housing, a sealing body formed of sealant to cover a coil end of the stator, a temperature sensitive device, an end cover, and a resilient retaining member. The electric motor shaft passes through the end cover. The sealing body includes a temperature-sensitive-device support surface opposed to the end cover. The temperature sensitive device is retained between the end cover and the temperature-sensitive-device
(Continued)

support surface while the retaining member is interposed between the temperature sensitive device and the end cover.

5 Claims, 4 Drawing Sheets

(51) Int. Cl.
*G01K 13/08* (2006.01)
*H02K 11/25* (2016.01)
*H02K 5/08* (2006.01)

(58) Field of Classification Search
USPC ................. 310/45, 43, 68 C, 410, 412, 416
See application file for complete search history.

(56) References Cited

U.S. PATENT DOCUMENTS

| | | | |
|---|---|---|---|
| 2002/0180577 A1 | 12/2002 | Heyden et al. | |
| 2003/0016476 A1* | 1/2003 | Yamamoto | H02K 11/25 361/25 |
| 2009/0232185 A1 | 9/2009 | Sasaki et al. | |
| 2009/0284202 A1 | 11/2009 | Miura | |
| 2010/0033040 A1* | 2/2010 | Wakita | H02K 11/25 310/54 |
| 2011/0285220 A1* | 11/2011 | Sonohara | H02K 5/225 310/53 |
| 2012/0126646 A1* | 5/2012 | Nakagawa | H02K 3/522 310/71 |
| 2012/0146563 A1 | 6/2012 | Zettner | |
| 2012/0313462 A1* | 12/2012 | Hartmann | H02K 11/0047 310/43 |
| 2013/0106251 A1 | 5/2013 | Kaneshige et al. | |
| 2014/0254632 A1 | 9/2014 | Kaneshige et al. | |

FOREIGN PATENT DOCUMENTS

| | | |
|---|---|---|
| CN | 101233396 A | 7/2008 |
| CN | 101261162 A | 9/2008 |
| CN | 101589546 A | 11/2009 |
| CN | 102483356 A | 5/2012 |
| DE | 9316897 U1 | 7/1994 |
| JP | 3-18246 A | 1/1991 |
| JP | 5-56611 A | 3/1993 |
| JP | 6-74075 U | 10/1994 |
| JP | 7-11876 U | 2/1995 |
| JP | 7-312850 A | 11/1995 |
| JP | 11-187606 A | 7/1999 |
| JP | 11225458 A * | 8/1999 |
| JP | 2002-39088 A | 2/2002 |
| JP | 2010-93962 A | 4/2010 |
| WO | WO 2011/117985 A1 | 9/2011 |

OTHER PUBLICATIONS

Mukaide, Machine Translation of JP03018246.*
Extended European Search Report dated Nov. 26, 2015 in Patent Application No. 13871511.5.
International Search Report dated Feb. 25, 2014 in PCT/JP2013/007512 filed Dec. 20, 2013.

* cited by examiner

ELECTRIC MOTOR

TECHNICAL FIELD

The present invention relates to an electric motor including a stator having coil ends, and a synthetic resin sealing member molded to seal the coil ends.

BACKGROUND ART

The background art of the invention is described with reference to the electric motor illustrated in FIG. 5. The electric motor includes an electric motor shaft 1, a rotor 2 which rotates about the electric motor shaft 1, a stator 3 disposed in an outer periphery of the rotor 2, a housing 4 having a tubular shape to house the rotor 2 and the stator 3, and an end cover 5 to be mounted on an axial end of the housing 4. The electric motor is placed in a vertical attitude of disposing the electric motor shaft 1 vertically, as exemplified by a slewing electric motor for an excavator. In the following, the axis direction of the electric motor may be called as up and down directions in the conventional art illustrated in FIG. 5 and in each of the embodiments of the invention to be described later, based on the aforementioned configuration. The upper side and the lower side in the drawings may be called as an upper portion (or an upper side) and a lower portion (or a lower side) of the electric motor. Besides, the "electric motor" described in the specification involves either of a generator and a generator motor configured to generate electric power by the same principle as the electric motor.

The end cover 5 is mounted on an upper end surface of the housing 4 with no-graphically-shown bolts. The upper portion of the electric motor shaft 1 is rotatably supported on the end cover 5 and the lower portion of the electric motor shaft 1 is rotatably supported on the lower portion of the housing 4, via respective bearings 6 and 7.

The stator 3 includes a stator core 8 constituted of laminated electromagnetic steel plates, and a stator coil 9 wound around the stator core 8 in up and down directions i.e., in the axis direction of the electric motor shaft 1 (hereinafter, also called as an electric motor axis direction). The stator coil 9 includes coil ends 9a which are respective turning portions on upper and lower sides, being wound so as to protrude the coil ends 9a beyond respective axial opposite ends of the stator core 8 in the electric motor axis direction.

The electric motor further includes a sealing body 10. The sealing body 10 is formed by potting sealant through an upper die into the housing 4 as a receiving die or a lower die in the state that the stator coil 9 has been wound and the stator 3 has been inserted into the housing 4. Used as the sealant is, for example, synthetic resin material such as unsaturated polyester having electrical insulation property and heat conductive property. The thus formed sealing body 10 covers at least the coil ends 9a, specifically, covers the entirety of the stator 3 or a part of the stator 3 including the coil ends 9a, thereby enhancing the heat conductive property from the stator 3 to the housing 4.

In the resin molded electric motor as described above, there may be disposed a temperature sensitive device S in the housing 4. The temperature sensitive device S is a device to be operated in response to temperature, for instance, a temperature measuring device for detecting a temperature of an electric motor such as a thermistor, or a temperature protection device for preventing excessive heating such as a temperature fuse. The temperature sensitive device S is generally embedded, as shown in FIG. 5, in the sealing body 10 together with the coil ends 9a. Hereinafter, the electric motor having the above configuration is called as an embedded type of electric motor (see Patent Literature 1 and Patent Literature 2).

There is also known an electric motor including a recess portion formed in a surface of a sealing body 10 and a temperature sensitive device is fixed by a bracket while being accommodated in the recess portion. Hereinafter, the electric motor having the above configuration is called as a retrofitted electric motor (see Patent Literature 3 and Patent Literature 4).

The conventional embedded electric motor and retrofitted electric motor, however, have the following disadvantages.

The embedded type of electric motor, where the temperature sensitive device S is embedded in the sealing body 10, can be easily assembled, but is unable to be repaired or replaced when inspected or being in trouble; the electric motor, therefore, has to be entirely replaced in the event of failure. Besides, there is a possibility that the resin injection pressure for molding the sealing body 10 acts on a soldered portion in the temperature sensitive device to bring the portion into damage or failure.

On the other hand, the retrofitted type of electric motor, which can be easily inspected, repaired, and replaced, has an excellent maintenance performance, but cannot be easily assembled because of involving a bracket for fixing the temperature sensitive device to prevent it from removal from the recess portion.

CITATION LIST

Patent Literature

Patent Literature 1: Japanese Unexamined Patent Publication No. H11-187606
Patent Literature 2: Japanese Unexamined Patent Publication No. 2010-93962
Patent Literature 3: Japanese Unexamined Patent Publication No. H3-18246
Patent Literature 4: Japanese Unexamined Patent Publication No. H7-312850

SUMMARY OF INVENTION

An object of the invention is to provide an electric motor capable of being easily assembled while possessing advantages of retrofitted type of electric motors, i.e., excellent maintenance performance and no fear of damage in a temperature sensitive device due to resin injection pressure. The electric motor provided by the invention includes: an electric motor shaft; a rotor which rotates about the electric motor shaft; a stator disposed in an outer periphery of the rotor; a housing which houses the rotor and the electric motor shaft; a sealing body formed in the housing, the sealing body being formed of sealant made of synthetic resin material having a heat conductive property and electrical insulation property, the sealant having been injected so as to cover at least a coil end of the stator; a temperature sensitive device disposed in the housing and configured to be operated in response to temperature; an end cover to be mounted on an axial end of the housing; and a retaining member having elasticity. The electric motor shaft is disposed to pass through the end cover. The sealing body has surfaces including a temperature-sensitive-device support surface opposed to the end cover. The temperature sensitive device is retained between the end cover and the temperature-sensitive-device support surface in a state that the retaining member is interposed between the temperature sensitive device and the end cover.

DESCRIPTION OF EMBODIMENTS

There will be described embodiments of the invention with reference to FIGS. 1 to 4. Each of the embodiments to be described below is directed to a resin mold type of electric motor placed in a vertical attitude of disposing an electric motor shaft vertically, as exemplarily described by a slewing electric motor for an excavator in the background art.

Figure 5:
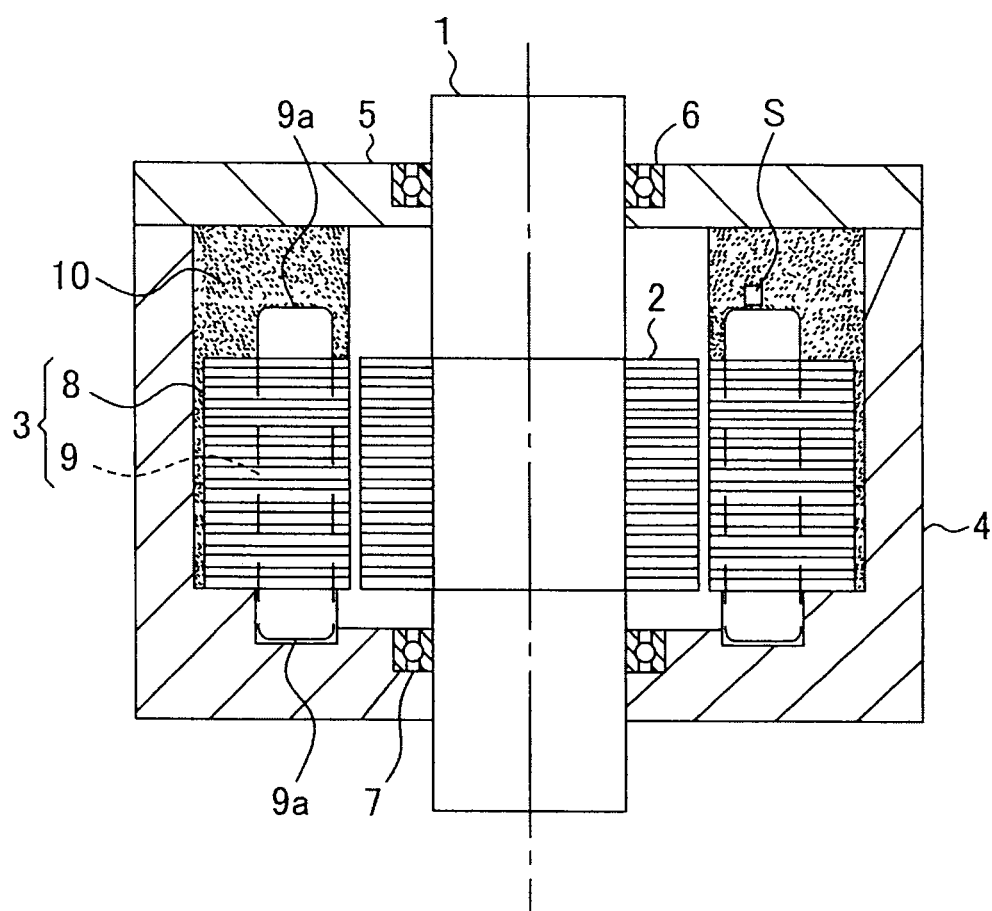
FIG. 5 is a sectional front view of a conventional electric motor.

The electric motors of respective embodiments share the following common configuration similarly to the conventional art illustrated in FIG. 5. Specifically, each of the electric motors includes an electric motor shaft 11, a rotor 12 which rotates about the electric motor shaft 11, a stator 13 disposed in the outer periphery of the rotor 12, a housing 14 which houses the rotor 12 and the stator 13, an end cover 15 to be mounted on an axial upper end of the housing 14, a sealing body 20, and a temperature sensitive device S, e.g., a temperature measuring device such as a thermistor. The end cover 15 is mounted on the upper end surface of the housing 14 with not-graphically-shown bolts. The upper portion of the electric motor shaft 11 is rotatably supported on the end cover 15 and the lower portion of the electric motor shaft 11 is rotatably supported on the lower portion of the housing 14, through respective bearings 16 and 17. The stator 13 includes a stator core 18 composed of laminated electromagnetic steel plates, and a stator coil 19 wound around the stator core 18 in up and down directions. The stator coil 19 includes coil ends 19a which are turning portions on respective upper and lower ends of the stator coil 19, being wound so as to protrude the coil ends 19a beyond respective axial opposite ends of the stator core 18 in the electric motor axis direction. The sealing body 20 is formed of sealant made of synthetic resin such as unsaturated polyester having electrical insulation property and a heat conductive property so as to cover at least a part of the stator 3, the part including each of the coil ends 19a, specifically, so as to cover the entirety of the stator 3 or a part of the stator 3, the part including each of the coil ends 19a.

Below will be described respective features of the embodiments.

Figure 1:
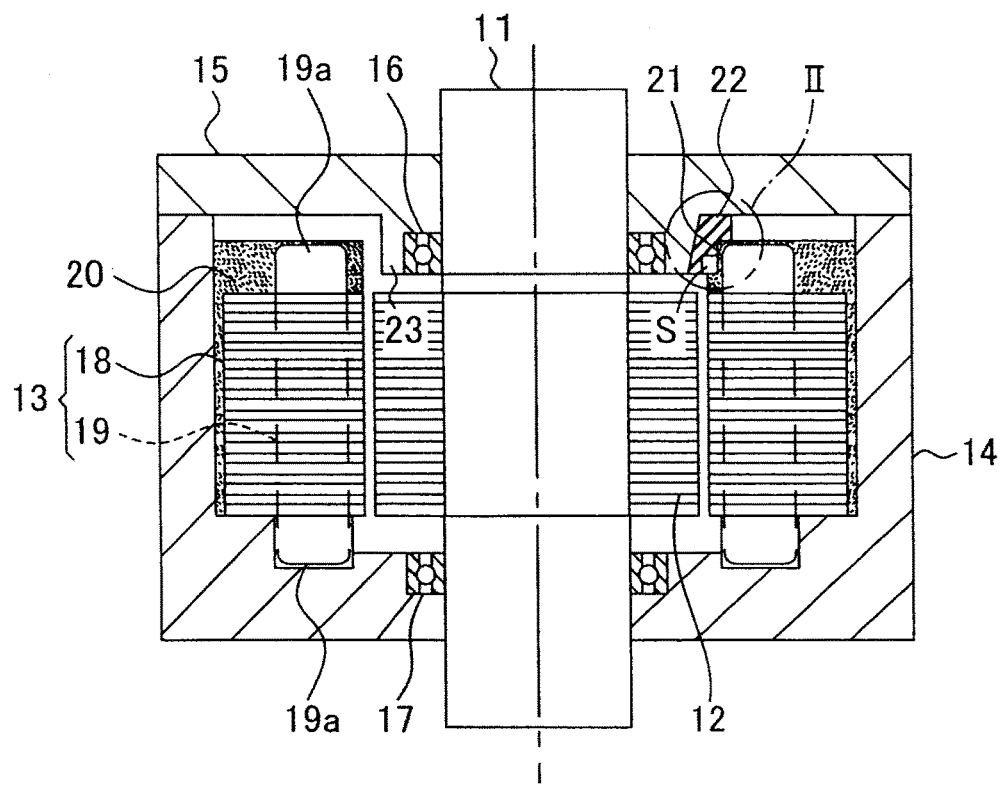
FIG. 1 is a sectional front view of an electric motor in a first embodiment of the invention.
Figure 2:
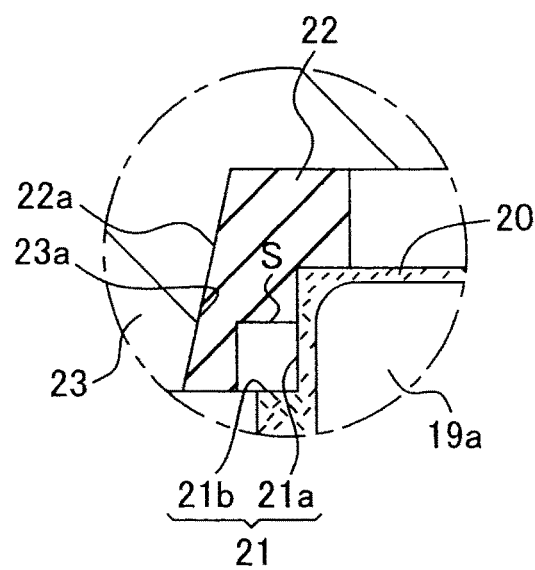
FIG. 2 is an enlarged view of a portion surrounded by the circle II in FIG. 1.

FIG. 1 and FIG. 2 show an electric motor in the first embodiment. The sealing body according to the first embodiment has a surface including a radially inner portion which covers an inner side surface of the upper coil end 19a, the radially inner portion being formed with a recess portion 21. The recess portion 21 is a recess opened upward and radially inward. The recess portion 21 can be formed by setting a die so as to prevent sealant from being potted as to a circumferential part of the inner diameter portion.

The temperature sensitive device S is disposed so as to be fitted into the recess portion 21. Specifically, the recess portion 21 formed by molding the sealing body 20 includes a temperature-sensitive-device contact surface 21a which is a vertical surface facing radially inward and a temperature-sensitive-device support surface 21b which is a horizontal surface facing upward. The temperature sensitive device S is placed on the temperature-sensitive-device support surface 21b in close contact with the temperature-sensitive-device contact surface 21a. Furthermore, the end cover 15 is mounted on the housing 14 while interposing a resiliently deformable retaining member 22 having elasticity such as a rubber member, that is, being elastically deformable, between the end cover 15 and the temperature sensitive device S.

The retaining member 22 has a shape covering surfaces of the temperature sensitive device S except for respective surfaces in contact with the temperature-sensitive-device contact surface 21a and the temperature-sensitive-device support surface 21b. The retaining member 22 may be preferably integrated with the temperature sensitive device S by advanced adhesion thereof to the temperature sensitive device S. The retaining member 22 enables the temperature sensitive device S to be elastically retained between the temperature-sensitive-device support surface 21b and the end cover 15 by the elasticity of the retaining member 22 and by a fastening force applied to the end cover 15.

The end cover 15 has a lower surface, i.e., an inner surface, including a center portion which forms a projection portion 23 projecting downward beyond the other portion of the end cover 15, i.e., beyond the outer periphery of the end cover 15. The projection portion 23 has a tubular shape including an outer circumferential surface and an inner circumferential surface. The outer circumferential surface thereof is opposed to the temperature-sensitive-device contact surface 21a of the recess portion 21 with a gap radially of the electric motor. The retaining member 22 is interposed between the temperature sensitive device S and the outer circumferential surface of the projection portion 23 so as to bridge the gap. The projection portion 23 also serves as a portion retaining the upper bearing 16. Specifically, the bearing 16 is interposed between the inner circumferential surface of the projection portion 23 and the outer circumferential surface of the electric motor shaft 11.

The temperature sensitive device S is thus fixed while being elastically retained not only in the axis direction of the electric motor, i.e., in up and down directions, but also in the radial direction of the electric motor, i.e., in a horizontal direction in the attitude shown in FIG. 1. For increasing the force for fixing the temperature sensitive device S with respect to the radial direction, it is preferable that, as shown in FIG. 2, the retaining member 22 and the projection portion 23 have respective surfaces 22a, 23a making contact with each other and each of the surfaces 22a, 23a is tapered axially inward (that is, downward in FIG. 2).

The material composing the retaining member 22 preferably has not only the elasticity but also property of suppressing heat conduction between the end cover 15 including the projection portion 23 and the temperature sensitive device S to one smaller than heat conduction between the sealing body 20 and the temperature sensitive device S, namely, low heat conductivity. Specifically, letting respective heat conductivities of the sealing body 20, the end cover 15, and the retaining member 22 be Ra, Rb, and Rc, respectively, the heat conductivities Ra, Rb, and Rc are preferably set such that Ra>Rc, and more preferably, such that Rb>Rc. This setting makes it possible to block the heat in the sealing body 20 from escaping outside and to block heat outside from intruding into the temperature sensitive device S.

Thus mounting the temperature sensitive device in such a retrofitting manner makes it possible to obtain the advantages inherent to a retrofitted type of electric motor, that is, the advantage of excellent maintenance performance because of being easily inspected, repaired, and replaced, and the advantage of no fear of damage in the temperature sensitive device due to a resin injection pressure; furthermore, retaining the temperature sensitive device S between the temperature-sensitive-device support surface 21b of the sealing body 20 and the end cover 15, and the retaining member 22 having elasticity and disposed between the temperature sensitive device S and the end cover 15 allow the temperature sensitive device S to be stably and resiliently retained and to be easily mounted. In summary, it is possible to enhance assembling performance while taking the advantages of a retrofitted type of electric motor, that is, the advantages of excellent maintenance performance and no fear of damage in the temperature sensitive device due to a resin injection pressure.

Furthermore, the first embodiment allows the following advantages to be obtained.

(I) In the case where the temperature sensitive device S is a temperature measuring device, disposing the temperature sensitive device S on the radial inner side of the sealing body 20 allows the temperature sensitive device S to measure temperature of a high temperature portion near the rotor, because the recess portion 21 is formed in the surface which is included in the surfaces of the sealing body 20 and covers the radial inner surface of the coil end 19a and the horizontal surface among the surfaces constituting the recess portion 21 constitutes the temperature-sensitive-device support surface 21b.

(II) Forming the recess portion 21 only in a circumferential part of the sealing body 20 can suppress distortion or damage in the sealing body 20 due to formation of the recess portion 21.

(III) The temperature sensitive device S can be firmly fixed by an elastic pressing force both in the axis direction of the electric motor and in the radial direction of the electric motor, because the inner surface of the end cover 15 includes the downward projection portion 23, the projection portion 23 being opposed to the recess portion 21 with a gap radially of the electric motor, the retaining member 22 being interposed between the temperature sensitive device S and the end cover 15 so as to bridge the gap.

(IV) The retaining member 22, which is made of material having property of suppressing the heat conduction between the temperature sensitive device S and the end cover 15 to one smaller than the heat conduction between the sealing body 20 and the temperature sensitive device S, can suppress the influence by external temperature to thus allow the temperature sensitive device S, if it being a temperature measuring device, to measure temperature of the electric motor accurately.

(V) The retaining member 22 and the temperature sensitive device S, being integral with each other by adhesion or the like, can be handled as one component. This facilitates assembling operation.

Figure 3:
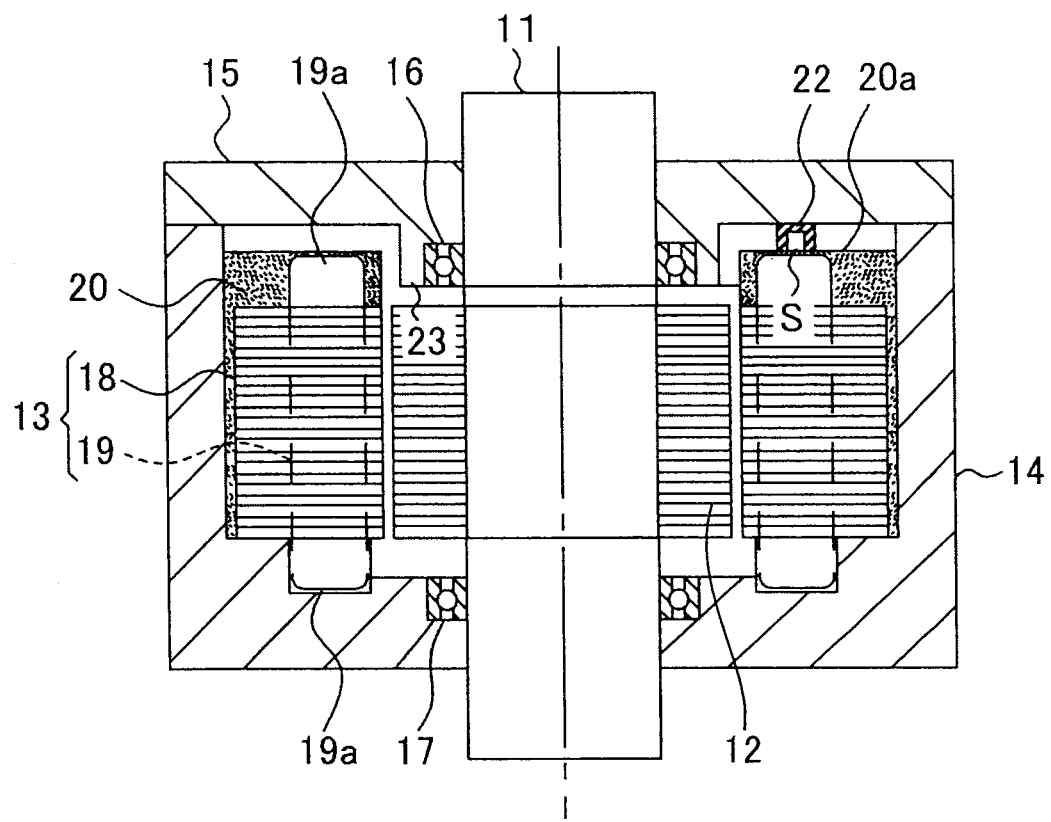
FIG. 3 is a sectional front view of an electric motor in a second embodiment of the invention.

Next will be described a second embodiment with reference to FIG. 3. Regarding the second embodiment and a below-described third embodiment, will be described only respective differences between the second and third embodiments and the first embodiment.

In the second embodiment, a temperature sensitive device S is elastically retained between the upper surface of a sealing body 20, namely, a temperature-sensitive-device support surface 20a, and an end cover 15, while a retaining member 22 covers the surfaces of the temperature sensitive device S except for the lower surface thereof. As well as the first embodiment, the temperature sensitive device S and the retaining member 22 are integrated with each other by adhesion. On the other hand, the end cover 15 includes a projection portion 23 as well as the first embodiment, but the projection portion 23 plays only a role as a member for retaining an upper bearing 16.

In the second embodiment, the sealing body 20 can be easily potted to lower manufacturing cost because of no necessity for applying a special treatment to the sealing body 20 in order to form the recess portion 21 according to the first embodiment, and the electric motor can be more easily assembled only by placing the temperature sensitive device S on the upper surface of the sealing body 20, that is, on a portion opened upward widely.

Figure 4:
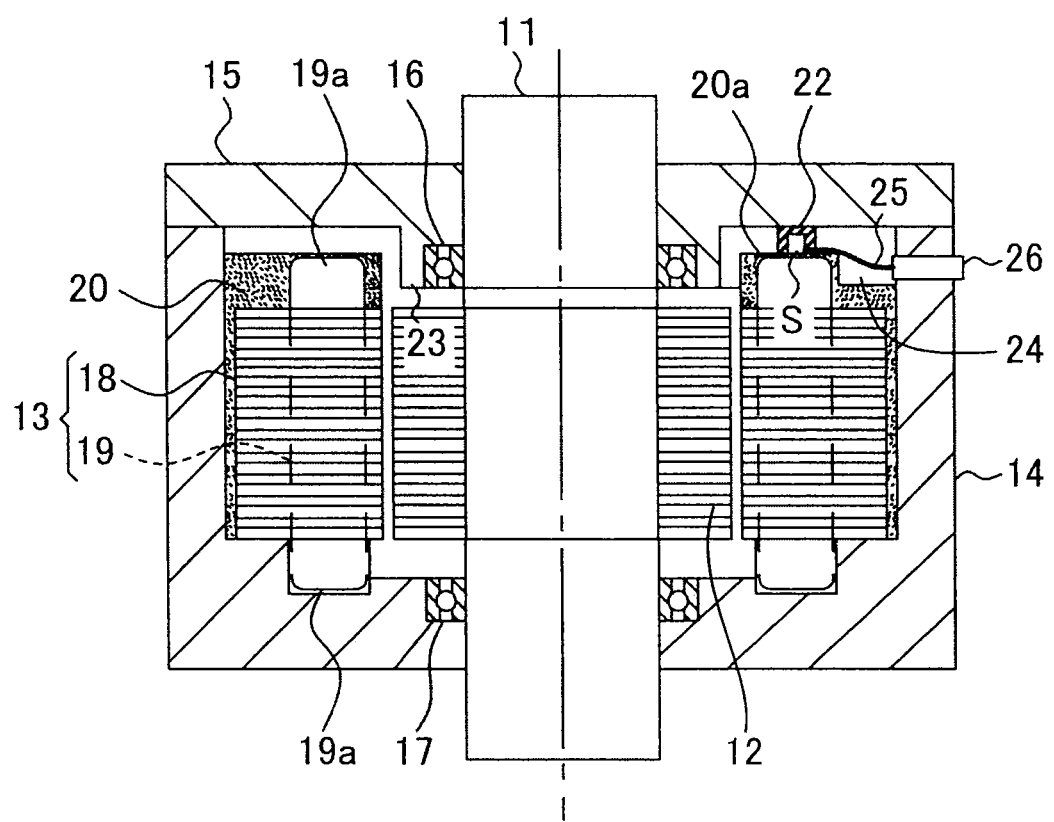
FIG. 4 is a sectional front view of an electric motor in a third embodiment of the invention.

Next will be described the third embodiment with reference to FIG. 4.

The third embodiment is based on the configuration of the second embodiment: between the upper coil end 19a and the side surface of a housing 14, there is formed a space portion 24 into which no sealant is injected, and there is drawn a conductive wire 25 from a temperature sensitive device S to be disposed in the space portion 24. Specifically, the conductive wire 25 is connected to a connector 26 for external wiring connection, through the space portion 24, the connector 26 being provided on a housing side wall. This arrangement facilitates connection of the conductive wire 25 connected to the temperature sensitive device S to an external wiring, thus further facilitating the assembling operation.

The configuration of the third embodiment may be implemented based on the configuration of the first embodiment.

The invention includes the following modified embodiments.

(1) The invention also includes an embodiment where a temperature sensitive device S and a retaining member 22 are not integral with each other.

(2) The temperature sensitive device S is not limited to a temperature measuring device. The temperature sensitive device according to the invention broadly includes all of devices configured to be operated in response to heat of an electric motor, such as a temperature protection device for preventing excessive heating (that is, a temperature fuse).

(3) The electric motor according to the invention is not limited to one placed in a vertical attitude; the invention is applicable to an electric motor disposed in a horizontal posture. As described above, the invention further includes a generator and a generator motor configured to be operated by the same principle.

As described above, according to the invention, provided is an electric motor capable of being easily assembled while possessing advantages of retrofitted type of electric motors, i.e., excellent maintenance performance and no fear of damage in a temperature sensitive device due to resin injection pressure. The electric motor includes: an electric motor shaft; a rotor which rotates about the electric motor shaft; a stator disposed in an outer periphery of the rotor; a housing which houses the rotor and the electric motor shaft; a sealing body formed in the housing, the sealing body being formed of sealant made of synthetic resin material having a heat conductive property and electrical insulation property, the sealant having been injected so as to cover at least a coil end of the stator; a temperature sensitive device disposed in the housing and configured to be operated in response to temperature; an end cover to be mounted on an axial end of the housing; and a retaining member having elasticity. The electric motor shaft is disposed to pass through the end cover. The sealing body has surfaces including a temperature-sensitive-device support surface opposed to the end cover. The temperature sensitive device is retained between the end cover and the temperature-sensitive-device support surface in a state that the retaining member is interposed between the temperature sensitive device and the end cover.

The electric motor makes it possible to obtain the advantages inherent to a retrofitted electric motor, specifically, the advantage of excellent maintenance performance because of being easily inspected, repaired, and replaced and the advantage of no fear of damage in the temperature sensitive device by resin injection pressure; furthermore, retaining the temperature sensitive device between the temperature-sensitive-device support surface of the sealing body and the end cover, and the retaining member having elasticity and disposed between the temperature sensitive device and the end cover, allows the temperature sensitive device to be easily mounted on the temperature sensitive device while being stably and elastically retained.

In the invention, when the temperature sensitive device is a temperature measuring device, it is preferable that the sealing body has a surface formed with a recess portion, the surface being a surface covering a radial inner surface of the coil end, the recess portion including a surface which is opposed to the end cover and forms the temperature-sensitive-device support surface. The recess portion, when the temperature sensitive device as the temperature measuring device is provided in the radial inner side of the sealing body, allows the temperature of a high temperature portion near the rotor to be measured.

In the aforementioned configuration, it is preferable that the recess portion is formed only in a circumferential part of the sealing body. This makes it possible to suppress distortion or damage in the sealing body due to formation of the recess portion in the sealing body.

In the invention, it is preferable that: the end cover has an inner surface including a center portion formed with a projection portion projecting axially inward of the end cover beyond a portion of the inner surface of the end cover other than the projection portion; the projection portion is opposed to the recess portion with a gap radially of the electric motor; and the retaining member is retained between the temperature sensitive device and the end cover so as to bridge the gap. These enable the temperature sensitive device to be more firmly fixed by elastic pressing force both in the axis direction of the electric motor and in the radial direction of the electric motor.

In the case where the temperature sensitive device is a temperature measuring device, preferable is that the retaining member is formed of material having a property of making heat conduction between the temperature sensitive device and the end cover be smaller than heat conduction between the sealing body and the temperature sensitive device. This restrains external temperature from impacting influence on the temperature sensitive device to thereby enable the temperature sensitive device to measure temperature of the electric motor accurately.

Preferably, the retaining member and the temperature sensitive device are integrally adhered to each other. This allows the retaining member and the temperature sensitive device to be handled as one component, thus further facilitating assembling operation.

In the case where the temperature sensitive device is connected with a conductive wire, it is preferable that a space portion devoid of the sealing body is formed between the coil end and the housing, the conductive wire being disposed in the space portion. This facilitates the connection of the conductive wire connected to the temperature sensitive device to an external wiring, thus further facilitating assembling operation.

The invention claimed is:

1. An electric motor comprising:
   an electric motor shaft;
   a rotor which rotates about the electric motor shaft;
   a stator disposed in an outer periphery of the rotor and having a coil end including an inner side surface facing inward in a motor radial direction perpendicular to a motor axial direction which is an axial direction of the electric motor shaft;
   a housing which houses the rotor and the electric motor shaft;
   a sealing body formed in the housing, the sealing body being formed of sealant made of synthetic resin material having a heat conductive property and electrical insulation property, the sealant having been injected so as to cover at least a coil end of the stator;
   a temperature sensitive device disposed in the housing and configured to be operated in response to temperature, the temperature sensitive device being a temperature measuring device;
   an end cover to be mounted on an axial end of the housing by an axial fastening force applied to the end cover in the motor axial direction, the end cover including an inner surface facing inward in the motor axial direction; and
   a retaining member having elasticity which allows the retaining member to be interposed between the temperature sensitive device and the inner surface of the end cover in the motor axial direction, wherein:
   the electric motor shaft is disposed to pass through the end cover;
   the sealing body has surfaces including a radially inner portion which covers the inner side surface of the coil end, the radially inner portion being formed with a recess portion opened outward in the motor axial direction and inward in the motor radial direction to include a temperature-sensitive-device contact surface facing inward in the motor radial direction and a temperature-sensitive-device support surface opposed to the inner surface of the end cover in the motor axial direction;
   the temperature sensitive device is placed on the temperature-sensitive-device support surface in close contact with the temperature-sensitive-device contact surface in the motor radial direction; and
   the end cover is mounted to the axial end of the housing by the axial fastening force applied to the end cover so as to elastically retain the temperature sensitive device between the inner surface of the end cover and the temperature-sensitive-device support surface by the axial fastening force applied to the end cover and the elasticity of the retaining member interposed between the temperature sensitive device and the inner surface of the end cover.

2. The electric motor according to claim 1, wherein the end cover has a center portion formed with a projection portion projecting axially inward of the end cover in the motor axial direction beyond the inner surface of the end cover, the projection portion having an outer circumferential surface opposed to the temperature-measuring-device contact surface of the recess portion in the motor radial direction with a gap, so as to retain the retaining member between the temperature sensitive device and the outer circumferential surface of the projection portion so that the retaining member bridges the gap.

3. The electric motor according to claim 1, wherein the retaining member is formed of a material having a property of making heat conduction between the temperature sensitive device and the end cover be smaller than heat conduction between the sealing body and the temperature sensitive device.

4. The electric motor according to claim 1, wherein the retaining member and the temperature sensitive device are adhered to each other to be integral with each other.

5. The electric motor according to claim 1, wherein a conductive wire is connected to the temperature sensitive device, and a space portion devoid of the sealing body is formed between the coil end and the housing, the conductive wire being disposed in the space portion.

* * * * *